Feb. 10, 1970 M. A. HUTNER 3,495,151
MEMORY CONTROL CIRCUIT FOR CLUTCHING BRAKING AND REVERSING A MOTOR
Filed April 29, 1968
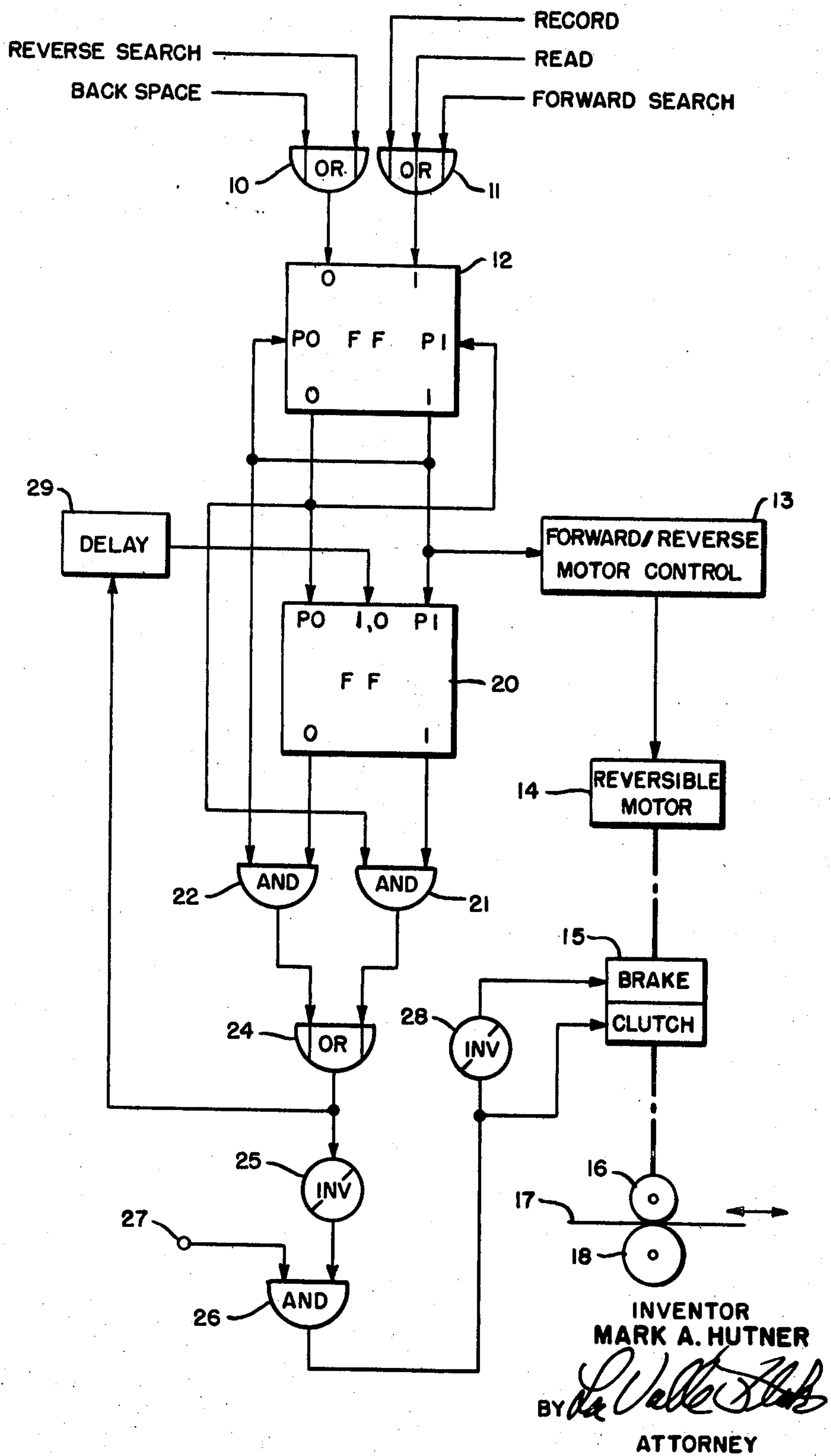
INVENTOR
MARK A. HUTNER
BY [signature]
ATTORNEY United States Patent Office 3,495,151
Patented Feb. 10, 1970

3,495,151

MEMORY CONTROL CIRCUIT FOR CLUTCHING, BRAKING AND REVERSING A MOTOR

Mark A. Hutner, Glenview, Ill., assignor to Teletype Corporation, Skokie, Ill., a corporation of Delaware Filed Apr. 29, 1968, Ser. No. 724,984
Int. Cl. H02p *1/04*
U.S. Cl. 318—284 8 Claims

ABSTRACT OF THE DISCLOSURE

A motor control system for a tape recorder which may be operated in forward and reverse modes includes a first bistable device which controls the motor direction and responds immediately to input commands. The motor is controlled by this device and immediately changes direction when a direction change is indicated. A second bistable device indicates the direction of motor operation prior to receipt of a new input. The state of both bistable devices is monitored; and if both are in the same state upon receipt of an input command, the tape drive clutch continues to be operated or is operated immediately. If the bistable devices are in different states upon receipt of an input command, a time delay circuit interrupts operation of the clutch and controls resetting of the direction indicating bistable device.

BACKGROUND OF THE INVENTION

Magnetic tape recorders are operated in several different modes of operation in both the forward and reverse directions. In each of these directions in many magnetic tape systems, different speeds may be utilized with slow speeds being used for recording and reading information and with high speeds being used for searching or rapidly moving to a new position on the tape. In such magnetic tape systems, it is necessary to temporarily disengage the capstan clutch whenever the direction of the motor is reversed in response to input commands requiring such a reversal. This is necessary in order to prevent damage to the tape or the equipment. On the other hand, whenever reversal of the motor is not required in response to a change in the input command signals, it is desirable to have the capstan clutch continue to be operated or to be engaged immediately, so that no operating time is lost.

In systems used in the past, a time delay in engaging the capstan clutch has been interposed each time a different command is supplied to the tape recorder irrespective of whether or not the command requires a reversal in the direction of operation of the motor or the capstan. This type of control, however, results in a waste of time when a change in the mode of operation in the same direction is made. For example, if the mode of operation is changed from a record to a read mode or from a record to a fast-search forward mode, no delay is necessary since the system already is operating in the forward direction and continues to operate in the forward direction.

In addition, the clutch control delay generally is effected by causing the direction control switch to pass through a neutral position which interposes the necessary delay. In most systems, the delay also is interposed with respect to the direction reversal of the motor itself as well as with respect to the operation of the capstan clutch. This results in additional unnecessary delay since the startup time of the motor for the new direction is added onto the delay interposed by the switch for the direction reversal.

SUMMARY OF THE INVENTION

In a motor control system for a magnetic tape recorder which may be operated in forward and reverse modes, a first control device controls the motor direction and responds immediately to input commands. A second control device provides an output indicative of the direction of the motor operation prior to receipt of a new input; and the state of both devices is monitored. If both are in the same state upon receipt of an input command, the tape drive clutch is operated immediately or continues to be operated. If both of these devices are in different states upon receipt of an input command, operation of the clutch is interrupted or delayed for a predetermined period of time; and the direction indicating device is reset to indicate the new direction.

BRIEF DESCRIPTION OF THE DRAWING

The single figure of the drawing is a block circuit diagram of a preferred embodiment of the invention.

DETAILED DESCRIPTION

In the description of the preferred embodiment of this invention which is to follow, the terms "high" and "low" are used to refer to the inputs and outputs utilized in operating the circuit. These terms are employed merely for purposes of illustration to indicate the relative potentials employed in the operation of the circuit in order to differentiate two different signal levels from one another. In actual practice, the "high" and "low" signals may be positive and negative, or ground and negative, or positive and ground potentials, respectively.

In the circuit diagram of the preferred embodiment of the invention shown in the drawing, two flip-flops are used for effecting the control of the motor. These flip-flops are of a type disclosed in detail in Patent No. 3,322,896, issued May 30, 1967, to F. D. Biggam. As a consequence, a detailed description of these flip-flops will not be given herein; but it should b noted that the flip-flops are of a type requiring a positive priming potential to be present before an input trigger signal associated with the priming input can set the flip-flop in accordance with the trigger signal.

Referring now to the drawing, there is shown a circuit diagram for controlling the direction of operation of the motor in a magnetic tape recorder in response to input commands, some of which require reversal of the motor while others merely require a different mode of operation with the same direction of operation of the motor. Input command signals are supplied to a pair of OR gates 10 and 11, with command signals for operation in the reverse direction being applied to the input of the OR gate 10, and with command signals requiring operation of the motor in the forward direction being applied to the input of the OR gate 11. Whenever a command signal is present, it is represented by a high input to the respective one of the OR gates 10 and 11, and only one input command signal may be present at any one time. This may be accomplished by any suitable means in the input switch configuration for the recorder.

The outputs of the OR gates 10 and 11 are applied to the "0" and "1" trigger inputs, respectively, of a direction control flip-flop 12. The "1" output of the flip-flop 12 is supplied to the priming input PO for the "0" trigger input, and the "0" output of the flip-flop 12 is supplied to the priming input P1 for the "1" trigger input of the flip-flop. The direction control flip-flop 12 is utilized to control the direction of operation of a reversible motor 14 in the recorder through a forward-reverse motor control 13; and the "1" output of the flip-flop 12 is supplied to the input of the motor control 13 and operates so that when a high input is supplied to the motor control circuit 13, the reversible motor 14 is caused to operate in the forward direction. When a low input is supplied to the motor control 13, the reversible motor 14 is caused to operate in the reverse direction. The motor control 13 and motor 14 may be of any suitable type commonly utilized in recorders of the general class with which this invention is associated.

The mechanical output of the motor 14 is applied through a clutch/brake unit 15 to drive a capstan 16, which in turn drives a tape 17 pressed against the capstan 16 by a pinch roller 18. Thus whenever the clutch of the clutch/brake unit 15 is engaged, the capstan 16 is driven in either the forward or reverse direction depending upon the direction of operation of the motor 14. Whenever the brake of the clutch/brake unit 15 is engaged and the clutch is released, the driving link between the motor 14 and capstan 16 is broken and the capstan 16 is decelerated by the action of the brake of the clutch/brake unit 15.

For purposes of illustration, assume that the motor 14 is operating in the forward direction in the "forward-search" mode of operation and that a change to the "record" mode of operation is desired. Both of these modes of operation are forward modes of operation; so that the output of the OR gate 11 remains high, and the output of the OR gate 10 is low. As a consequence, the "1" output of the direction control flip-flop 12 is high and the "0" output of the direction control flip-flop 12 is low and remains low. The "1" output of the flip-flop 12 is supplied to the motor control unit 13 as described previously and also is applied to the P1 priming input of a direction indicating flip-flop 20. The "0" output of the flip-flop 12 is applied to the P0 priming input of the direction indicating flip-flop 20. Since no change in motor direction was indicated at the inputs of the direction indicating flip-flop 20, it remains set to its "1" state providing a high output on the "1" output and a low output on its "0" output.

The "1" output of the flip-flop 20 and the "0" output of the flip-flop 12 are supplied as inputs to an AND gate 21, with the "0" output of the flip-flop 20 and the "1" output of the flip-flop 12 being supplied to the inputs of an AND gate 22. Since the flip-flops 12 and 20 have been assumed to be set to their "1" states, each of the AND gates 21 and 22 are low; and these outputs are supplied to thereto. As a consequence, the outputs of both the AND gates 21 and 22 are low; and these outputs are supplied to the two inputs of an OR gate 24, the output of which is low and is supplied through an inverter 25 to one input of an AND gate 26. During normal operation of the circuit, the other input to the AND gate 26 is a high input obtained on a clutch control input terminal 27; and the input on the terminal 27 remains high so long as the control circuit is being operated. Thus, when both inputs to the AND gate 26 are high (which occurs when the output of the OR gate 24 is low), a high signal is applied to the clutch of the clutch/brake unit 15. At the same time, the output of the AND gate 26 is inverted by an inverter 28 which applies a low signal to the brake of the clutch/brake unit 15. The clutch/brake unit 15 may be a conventional electromagnetically operated unit, requiring a high input to operate either the clutch or the brake. As a result, when a low output is obtained from the OR gate 24, the brake is not operated; but the inverter 25 causes a high input to be applied to the clutch and a low input to be applied to the brake of the clutch/brake unit 15 from the output of the AND gate 26, resulting in engagement of the clutch and disengagement of the brake. Thus, the driving link between the motor 14 and the capstan 16 is complete and is unaffected by a change in the mode of operation from a forward-search mode to a record mode. It should be noted that the AND gates 21 and 22 and the OR gate 25 form an exclusive OR gate.

Now assume that the system is in the forward mode of operation described in the previous paragraph, but that an input command signal is applied to the "reverse-search" input. This causes a high input to be applied to the OR gate 10, resulting in a high output being obtained therefrom. At the same time, the inputs to the OR gate 11 all are low so that a low output is obtained from that OR gate. This results in a high trigger input being applied to the "0" input of the flip-flop 12, and this input causes the flip-flop 12 to be set to its "0" state, since a high priming input was being applied to the P0 input of the flip-flop 12 and from the "1" output during the previous mode of operation. Since the flip-flop 12 is set to its "0" state, its "0" output goes high and its "1" output goes low. As soon as the "1" output goes low, the forward-reverse motor control circuit 13 is supplied with this low output signal and causes immediate reversal of the direction of operation of the motor 14.

At the same time, however, the AND gate 21 is provided with a high input on both of its inputs due to the fact that the direction indicating flip-flop 20 continues to provide a high output on its "1" output, indicating the previous direction of the motor 14, and the "0" output of the flip-flop 12 now is high and is applied to the AND gate 21. Both inputs to the AND gate 22 are low, so that the output of this AND gate does not change. The output of the AND gate 21, however, now is high, so that the output of the AND gate 24 goes high. This causes a high input to be applied to the brake of the clutch/brake unit 15 and a low input to be applied to the clutch of the clutch/brake unit 15 from the output of the AND gate 26. As a consequence, the capstan 16 is disengaged from the motor 14 and the capstan motion is decelerated towards a stop by the application of the brake in the clutch/brake unit 15.

At the same time, the high output of the OR gate 24 is supplied to the input of a delay circuit 29, the output of which is supplied to the "1" and "0" trigger inputs of the flip-flop 20. The duration of the delay provided by the delay circuit 29 is chosen to be sufficient to allow complete reversal of the motor to take place and to permit the brake of the clutch/brake unit 25 to bring the capstan 16 to a stop. After this predetermined time interval, a high output is obtained from the delay circuit 29, causing the flip-flop 20 to be set to its "0" state, since the P0 input of the flip-flop 20 is supplied with a high input and the P1 input is supplied with a low input from the outputs of the flip-flop 12, as described previously. As soon as the flip-flop 20 is set to its "0" state, both of the AND gates 21 and 22 once again have one high and one low input applied thereto; so that both inputs to the OR gate 24 once again are low. As soon as this occurs, the brake of the clutch/brake unit 15 is released and the clutch is engaged due to the positive input applied to the input of the AND gate 26 from the output of the inverter 25. The system now is operating in the reverse direction and continues to do so so long as input command signals are applied to the input of the OR gate 10. It makes no difference as to which input command signal is chosen; so that if a change from the "reverse-search" mode of operation to the "back-space" mode of operation is desired, the clutch continues to be engaged and the motor 14 continues to drive the capstan 16.

If, however, a change back to a forward mode of operation is desired, the inputs to the OR gate 10 then all are low with a high input being applied to the OR gate 11. This high input then is passed by the OR gate 11 and is applied to the "1" input of the flip-flop 12, causing that flip-flop to be set to its "1" state. This immediately causes the forward-reverse motor control unit 13 to reverse the direction of operation of the motor 14 back to the forward direction of operation. At the same time, the direction indicating flip-flop 20 continues to be set to its "0" state, indicating the previous direction of operation of the motor 14 (reverse direction); so that the output of the OR gate 24 once again becomes positive due to the fact that both inputs to the AND gate 22 then are positive. Thus, the brake is operated and the clutch is released for a predetermined period of time until the output of the delay circuit 29 causes the direction indicating flip-flop 20 to change states.

In summary, it can be seen that this control circuit permits immediate operation of the clutch or continued operation of the clutch when no motor reversal is required upon receipt of an input command signal. On the other hand, whenever the direction of the operation of the motor 14 is to be reversed due to an input command signal requiring a reversal of operation, the motor 14 is immediately reversed while the operation of the clutch is delayed for a predetermined period of time. Although the foregoing description has been directed to an embodiment employing a moveable record medium in the form of a magnetic tape, the system could be employed with any elongated data storage member in which forward and reverse movement of the member is required.

Although the invention has been described in conjunction with the particular embodiment shown in the drawing, it is to be understood that the invention is not limited to that specific embodiment but is capable of modification and rearrangement without departing from the spirit and scope of the invention.

I claim:

1. A bidirectional system for controlling the motion of a moveable recording medium capable of being moved in forward and reverse directions in response to input command signals comprising:
- means in driving engagement with said medium for moving said medium;
- means for driving the medium moving means;
- means for interconnecting the driving means and the medium moving means;
- means responsive to said input command signals for controlling the direction of operation of the driving means;
- means for indicating the direction of operation of the driving means prior to the occurrence of an input command signal; and
- means responsive to the direction controlling means and the direction indicating means for disconnecting the interconnecting means for a predetermined period of time whenever the controlling means and indicating means indicate different directions of operation of the driving means.

2. In a system for controlling the motion of an elongated data storage member which may be moved in forward and reverse directions in response to input command signals,
- a reversible motor;
- means responsive to said input command signals for controlling the direction of operation of the motor;
- means for indicating the direction of motor operation prior to receipt of an input command signal;
- means for moving said member;
- a drive clutch interconnecting the motor and the member moving means;
- means responsive to the outputs of the motor direction control means and the motor direction indicating means for controlling the operation of the drive clutch, the engagement of the clutch being delayed only if the outputs of the motor direction control means and motor direction indicating means indicate different directions of operation of the motor; and
- means for resetting the motor direction indicating means to indicate a new direction after a predetermined time period has elapsed following a change in the direction of operation of the motor.

3. A system according to claim 2 wherein the motor direction control means and motor direction indicating means are bistable devices.

4. A system according to claim 2 wherein the clutch operating means is an exclusive OR gate provided with inputs from the motor direction control means and the motor direction indicating means.

5. A control system for a moveable recording medium capable of being moved in forward and reverse directions including:
- a drive motor;
- a first memory device responsive to input control commands for controlling the direction of operation of the drive motor;
- a second memory device for indicating the direction of the motor operation prior to receipt of an input command signal by the first memory device;
- a capstan for moving the recording medium;
- a clutch/brake mechanism interconnecting the motor output and the capstan;
- means responsive to the outputs of the memory devices for controlling the operation of the clutch/brake mechanism, said means causing operation of the clutch whenever the outputs of the memory devices bear a first relationship and said means causing operation of the brake whenever the outputs of the memory devices bear a second relationship; and
- means responsive to the output of the clutch/brake control means for changing the state of the motor direction indicating memory device a predetermined time after the output of the clutch/brake control means indicates that the outputs of the memory devices bear said second relationship, whereupon the outputs of the memory devices are caused to bear said first relationship, which in turn results in an output from the clutch/brake control means for releasing the brake and operating the clutch.

6. A system according to claim 5 in which the memory devices are bistable flip-flops.

7. A system according to claim 5 wherein the clutch/brake control means is a comparator circuit responsive to the output of the memory devices.

8. A system according to claim 7 in which the comparator is an exclusive OR gate.

References Cited

UNITED STATES PATENTS

| | | | |
|---|---|---|---|
| 2,574,218 | 11/1951 | Lynch | 179—100.2 |
| 3,206,133 | 9/1965 | Forster | 242—55.12 |
| 3,217,993 | 11/1965 | Blakistone | 242—55.12 |
| 3,230,435 | 1/1966 | Andrews | 318—284 |
| 3,322,896 | 5/1967 | Biggam | 178—53.1 |
| 3,353,007 | 11/1967 | Combs | 179—100.2 |

OTHER REFERENCES

McCluskey: "Introduction to the Theory of Switching Circuits," 1965, McGraw-Hill, pp. 91, 92, 9, 69, 93.

ORIS L. RADER, Primary Examiner

A. G. COLLINS, Assistant Examiner

U.S. Cl. X.R.

318—364